(12) United States Patent
Woodhouse et al.

(10) Patent No.: US 7,296,844 B2
(45) Date of Patent: Nov. 20, 2007

(54) AUTOMOTIVE DOOR WITH REVERSE HINGE

(75) Inventors: David Woodhouse, Newport Coast, CA (US); Tyler Blake, Rancho Santa Margarita, CA (US); Freeman Thomas, Laguna Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/326,860

(22) Filed: Jan. 6, 2006

(65) Prior Publication Data

US 2007/0158974 A1 Jul. 12, 2007

(51) Int. Cl.
*B60J 5/04* (2006.01)

(52) U.S. Cl. ............... 296/146.11; 296/202; 49/36; 49/40

(58) Field of Classification Search ........... 296/146.11, 296/146.12, 202, 155, 146.4; 49/36, 40
See application file for complete search history.

(56) References Cited

U.S. PATENT DOCUMENTS

| 2,903,296 | A | * | 9/1959 | Barenyi | 296/146.13 |
| 3,061,362 | A | * | 10/1962 | Maruyama | 296/146.4 |
| 3,275,370 | A | * | 9/1966 | Smith | 296/63 |
| 4,671,563 | A | * | 6/1987 | Shakespear | 296/181.1 |
| 6,247,744 | B1 | * | 6/2001 | Townsend et al. | 296/146.11 |

FOREIGN PATENT DOCUMENTS

| DE | 3810762 | * | 10/1989 | 296/146.11 |
| FR | 2699458 | * | 6/1994 | 296/146.11 |
| JP | 3693057327 | * | 3/1988 | 296/146.11 |

OTHER PUBLICATIONS

Lamborghini Countach Anniversairo, 1 page.
Lamborghini Murcielago, 2 pages.
Lamborghini LP 400 Countach, 1 page.
Delorean.com, 2 pages.

* cited by examiner

*Primary Examiner*—Dennis H. Pedder
(74) *Attorney, Agent, or Firm*—Frank A. MacKenzie; Brooks Kushman P.C.

(57) ABSTRACT

An automotive vehicle is disclosed having a vehicle body with a passenger compartment and a door opening to the passenger compartment. A door is pivotally mounted to the door opening with an inclined axis which may extend laterally outboard and downward relative to the vehicle body in a rearward direction of the vehicle. The door opening may be provided through a sidewall and a roof of the vehicle; and the door may be provided with a side panel and a roof panel to match the door opening. Also disclosed is a hinge arrangement for attaching the door to the vehicle body at an upper region and a rearward region of the door.

16 Claims, 7 Drawing Sheets

AUTOMOTIVE DOOR WITH REVERSE HINGE

BACKGROUND OF THE INVENTION

1. Field of the Invention

The invention relates to automotive vehicle doors, more particularly to hinge arrangements and door openings for automotive doors.

2. Background Art

The prior art has provided vehicles with doors pivotally mounted about vertical hinges. Various vehicles require large door openings, such as two-door vehicles or vehicles with a compact height including sports cars and roadsters. In these types of vehicles, a large door with a vertical hinge requires a substantially large lateral space for opening the door.

The prior has also provided doors that are pivotally connected to the vehicle about a horizontal hinge. Such doors often require the occupant to duck beneath the door in order to enter the vehicle.

The prior has also provided doors that are pivotally connected to the vehicle at a forward end of the door such that a rear end of the door is pivoted up and away from the vehicle, while the forward end is displaced along a forward region of the door opening. Such doors often limit clearance at the forward region of the door opening.

SUMMARY OF THE INVENTION

An embodiment of the present invention provides an automotive vehicle with a vehicle body having a passenger compartment for transporting passengers. The vehicle body has a door opening for permitting passenger ingress and egress to and from the passenger compartment. A door is mounted to the vehicle body about a pivotal connection for rotary translation between a closed orientation and an open orientation of the door. The pivotal connection has an inclined axis extending laterally away from the vehicle body and downward relative to the vehicle body in a rearward direction of the vehicle.

Another embodiment of the present invention provides an automotive vehicle with a body having lateral sidewalls and a roof with a passenger compartment therein for transporting passengers. The body has a door opening formed through one of the sidewalls and the roof for permitting passenger ingress and egress. A door has a side panel sized to engage the door opening at the sidewall and a roof panel extending from a top region of the side panel, which is sized to engage the door opening at the roof. The door is operably mounted to the vehicle body for translation between a closed orientation and an open orientation of the door.

A further embodiment of the present invention provides an automotive vehicle with a body with a passenger compartment. A door opening is provided in the body for permitting passengers to enter and exit the passenger compartment. A door has an upper region and a rearward region relative to the vehicle body. The upper and rearward regions of the door are each pivotally connected to the vehicle body for rotary translation between a closed orientation and an open orientation of the door.

The above embodiments, and other embodiments, aspects, objects, features, and advantages of the present invention are readily apparent from the following detailed description of embodiments of the invention when taken in connection with the accompanying drawings.

BRIEF DESCRIPTION OF THE DRAWINGS

FIG. 4a is an enlarged partial perspective view of a hinge and a pivot axis of FIG. 4;

DETAILED DESCRIPTION OF EMBODIMENTS OF THE INVENTION

As required, detailed embodiments of the present invention are disclosed herein; however it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
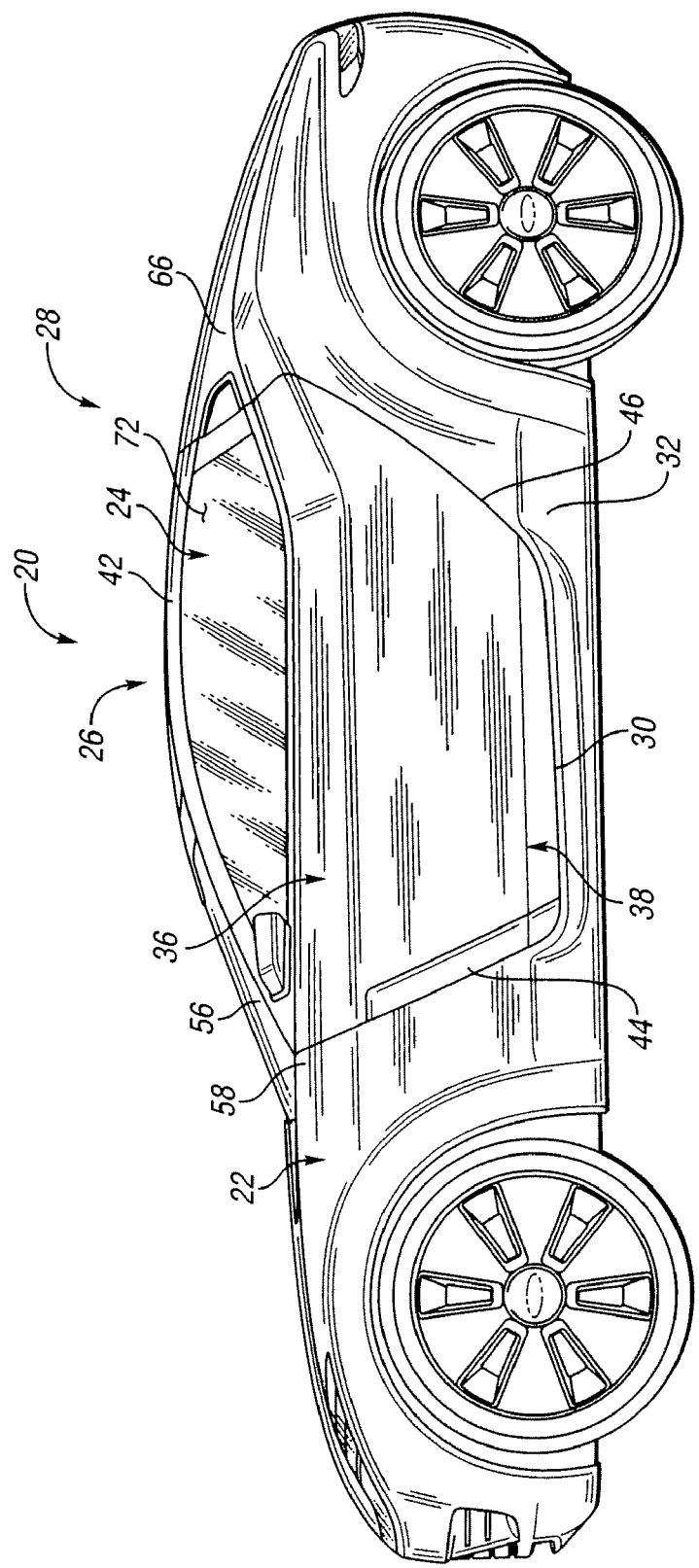
FIG. 1 is a side elevation view of an automotive vehicle in accordance with the present invention.

With reference now to FIG. 1, an automotive vehicle is illustrated in accordance with the present invention and is referenced generally by numeral 20. The automotive vehicle 20 is illustrated as a two-door coupe, however, the invention contemplates that the teachings of the present invention may be utilized with various automotive vehicles including passenger vehicles, utility vehicles, commercial vehicles and the like.

Two-door vehicles, particularly two-door vehicles having a door on each of a pair of opposed lateral sides of the vehicle, encounter the design constraints associated with passenger ingress to and egress from the vehicle. Particularly, two-door vehicles having multiple seating positions, such as the vehicle 20 illustrated in FIG. 1, involve design criteria requiring doors that are sufficiently sized to permit occupant ingress and egress to multiple seating rows of the passenger compartment. Additionally, various passenger vehicles, such as the coupe illustrated in FIG. 1, are generally lower to the ground for a lowered center of gravity for enhancing the handling and performance of the vehicle. These vehicles often include seating that is relatively low to a floor in the vehicle due to the compact height. Such compact height vehicles with lowered seats require the passenger to extend his or her legs forward within the passenger compartment of the vehicle 20. All of these design characteristics, which are appreciated by the vehicle 20 of an embodiment of the present invention, are factors associated with designing doors of the vehicle.

Figure 2:
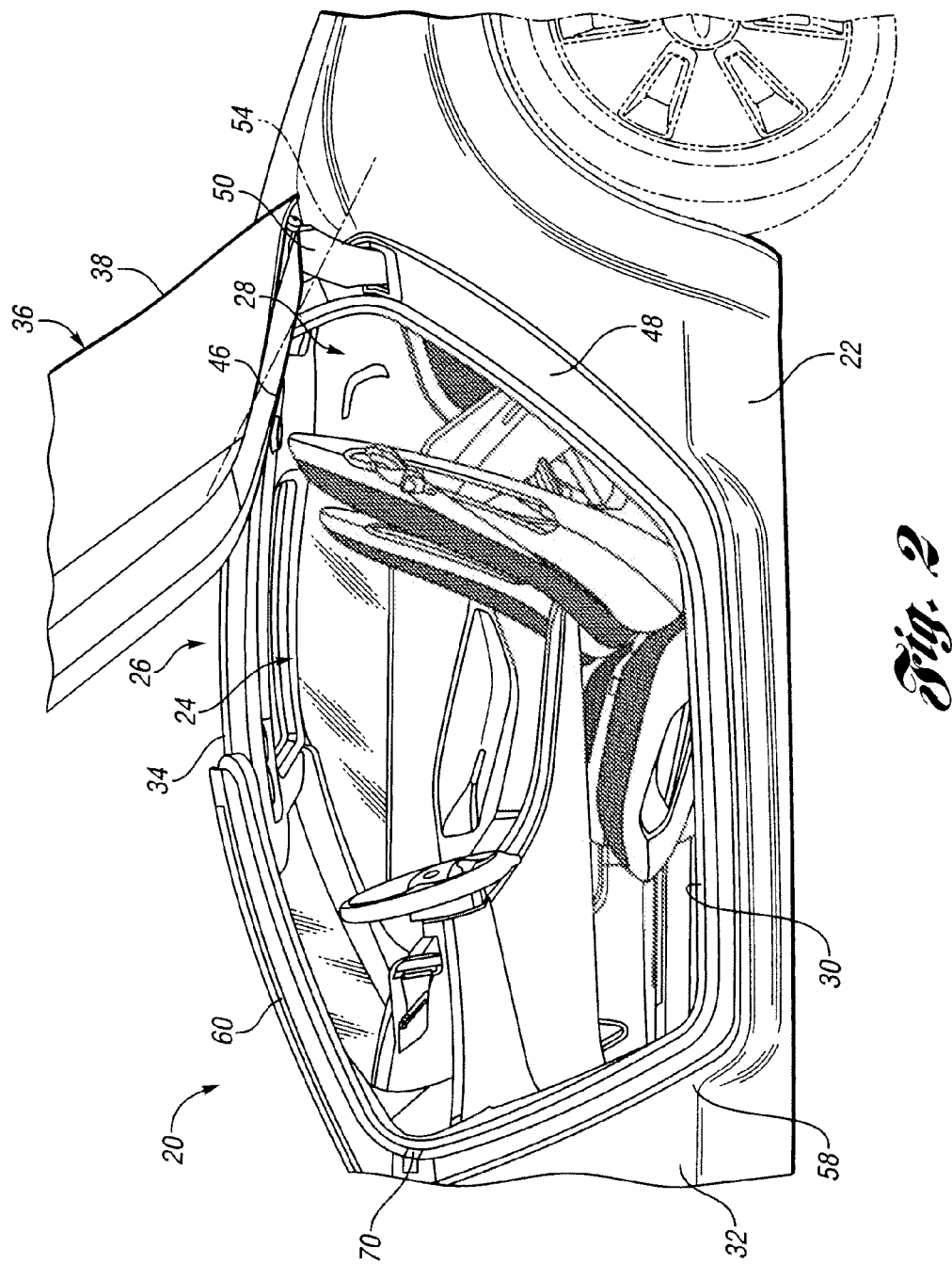
FIG. 2 is an enlarged side elevation view of the automotive vehicle of FIG. 1, illustrated with a door thereof in an open orientation.

Referring now to FIGS. 1 and 2, the automotive vehicle 20 has a vehicle body 22 provided with a passenger compartment 24 for comfortably seating and transporting passengers. For the embodiment illustrated, multiple seating rows are provided within the passenger compartment 24, including a front seating row 26 and a rear seating row 28. In order to accommodate occupant ingress to an egress from the multiple seating rows 26, 28 of the passenger compartment 24, a door opening 30 is provided in the vehicle body 22. The door opening 30 is sized to accommodate the entering and exiting of front and rear rows 26, 28 of the passenger compartment 24.

The door opening 30 is illustrated formed through a lateral sidewall 32 and a roof 34 of the vehicle body 22. Of course, the invention contemplates utilization of the present invention in various door openings in various regions of the vehicle body 22. For example, the automotive vehicle 20 of the embodiment illustrated is symmetrical with mirror image lateral halves, as is typical with many passenger vehicles. Thus, the embodiment of the automotive vehicle 20 illustrated is provided with a door opening 30 on both lateral sidewalls 32 of the vehicle and the door openings 30 both extend at least partially through the roof 34.

Of course, the invention contemplates that both door openings 30 may overlap a central region of the roof 34 such that a larger region of the roof 34 is utilized for the door opening than that depicted by the present embodiment automotive vehicle 20.

Although the door opening 30 is illustrated formed through both the lateral sidewall 32 and the roof 34 of the vehicle body 22, the invention contemplates utilization of various features in accordance with the present invention with or without the door opening 30 being formed through the roof 34.

Figure 3:
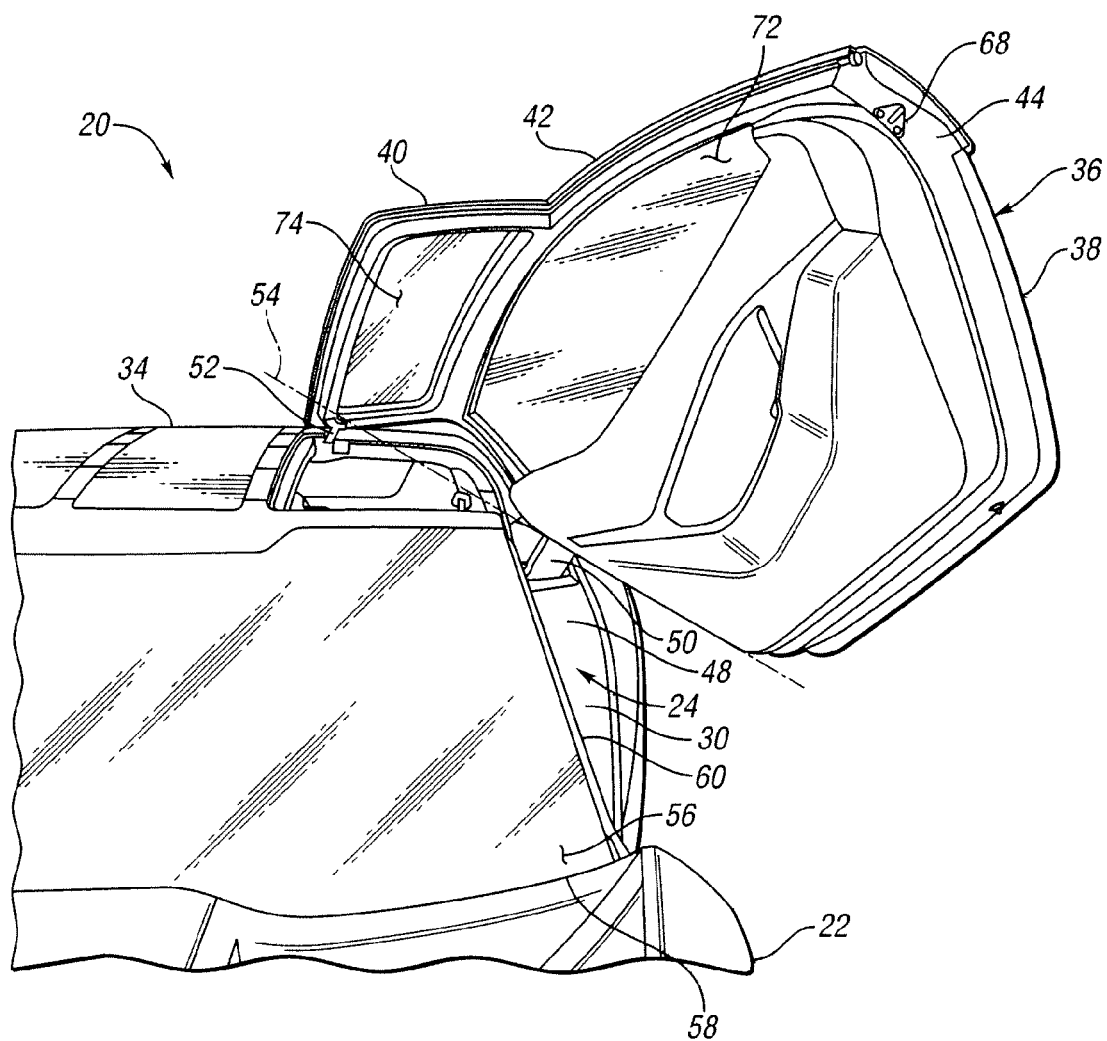
FIG. 3 is a partial front end perspective view of the automotive vehicle of FIG. 1, illustrated with the door in the open orientation.
Figure 4:
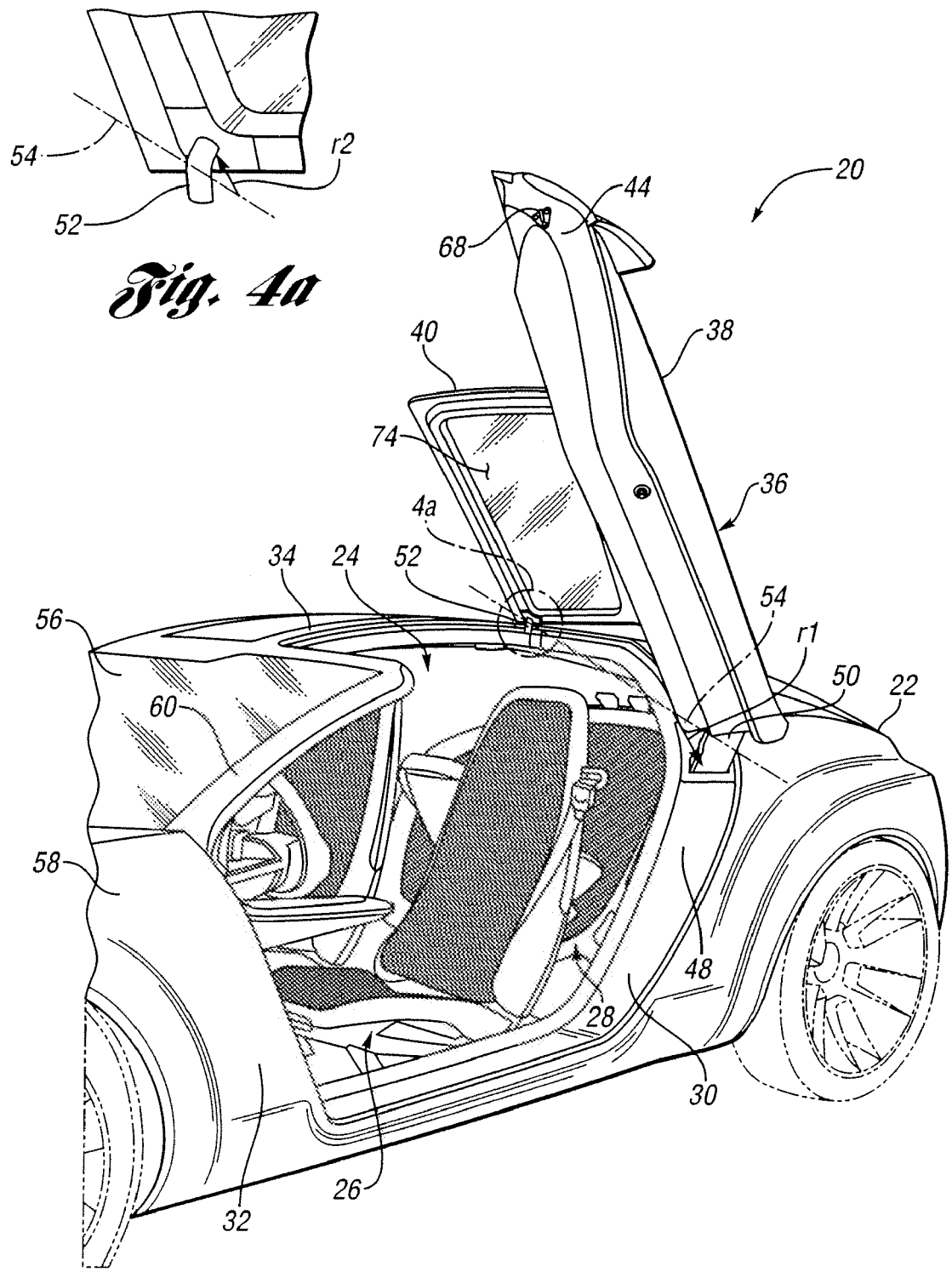
FIG. 4 is a partial side perspective view of the automotive vehicle of FIG. 1, illustrated with the door in the open orientation.

Referring now to FIGS. 1-4, the vehicle 20 includes a door 36 sized to enclose the passenger compartment 24 by mating with the perimeter of the door opening 30. The door 36 is operably connected to the vehicle body 22 for translation from a closed orientation, as illustrated in FIG. 1 to an open orientation as illustrated in FIGS. 2-4. Since the door opening 30 of the depicted embodiment extends through the lateral sidewall 32 and the roof 34 of the vehicle body 22, the door 36 includes a matching side panel 38 with a roof panel 40 extending laterally inboard from a top region 42 of the door side panel 38. Thus, the door side panel 38 and door roof panel 40 collectively provide the door 36 for closing the door opening 30.

In order to displace the door 36 relative to the vehicle body 22 to an upper orientation that optimizes the door opening 30 for occupant ingress and egress, the door 36 is translated vertically upward relative to the vehicle body 22 and laterally outboard relative to the vehicle body. During the translation of the door 36 to the open orientation, the door 36 is also rotationally translated such that a forward region of the door 44 is translated upward and outboard from the vehicle body 22 at a greater rate than that of a rearward region 46 of the door 36.

In order to translate the door 36 between the closed and opened orientations, the door 36 may be pivotally connected to the vehicle body 22. For example, the rearward region 46 of the door 36 may be pivotally connected to a rearward region 48 of the door opening 30 by a hinge 50. Another hinge 52 is provided on an upward region of the door 36 for pivotally connecting the door roof panel 40 to the roof 34 of the vehicle body 22.

The hinges 50, 52 provide a pivot axis 54 of the door 36 that extends laterally away from the vehicle body 22 from the roof panel hinge 52 to the rearward door hinge 50. The lateral arrangement of the pivot axis 54 is illustrated in FIGS. 3 and 4. Additionally, the pivot axis 54 is inclined downward from the roof panel hinge 52 to the rearward door hinge 50 as illustrated in FIGS. 2-4.

The door opening 30 diverges as it extends upward relative to the vehicle body 22 as illustrated in FIG. 2. The taper of the divergent door opening 30 maximizes a longitudinal length of the door opening 30 for accommodating entering and exiting both rows 26, 28 of the passenger compartment 24.

The door opening 30 partially follows a perimeter of a windshield 56 of the vehicle 20. The windshield 56 is a transparent panel mounted to the vehicle body 22 at a forward region 58 of a passenger compartment 24. A structural pillar 60, commonly referred to as an A-pillar, is displaced along a lateral side of the windshield 56. The A-pillar 60 may form a portion of the door opening 30. The door opening 30 may also partially extend along a top region of the windshield 56 thereby providing an enlarged door opening 30 through the roof 34. Thus, the door side panel 38 engages the A-pillar 60 in the closed orientation and the door roof panel 40 extends to the top region of the windshield 56 and a distal end of the A-pillar 60.

Figure 7:
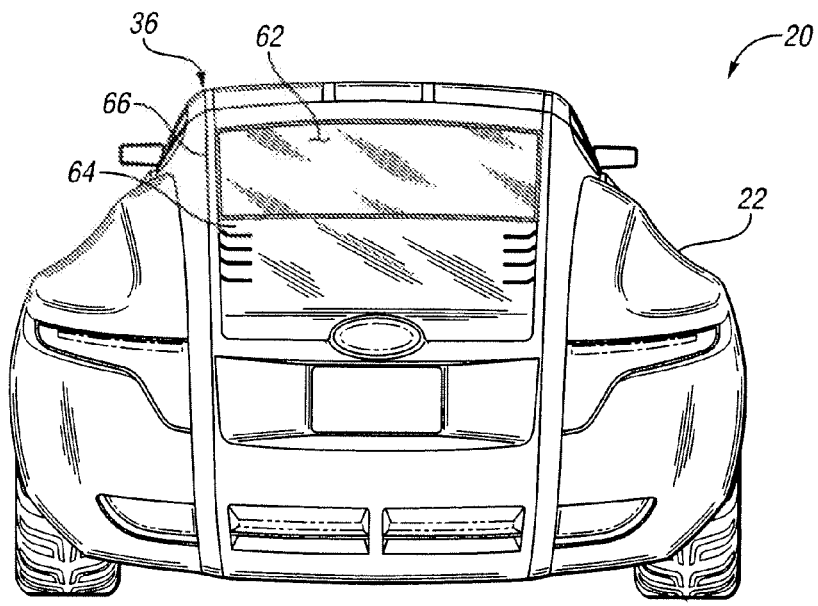
FIG. 7 is a rear end elevation view of the automotive vehicle of FIG. 1.
Figure 8:
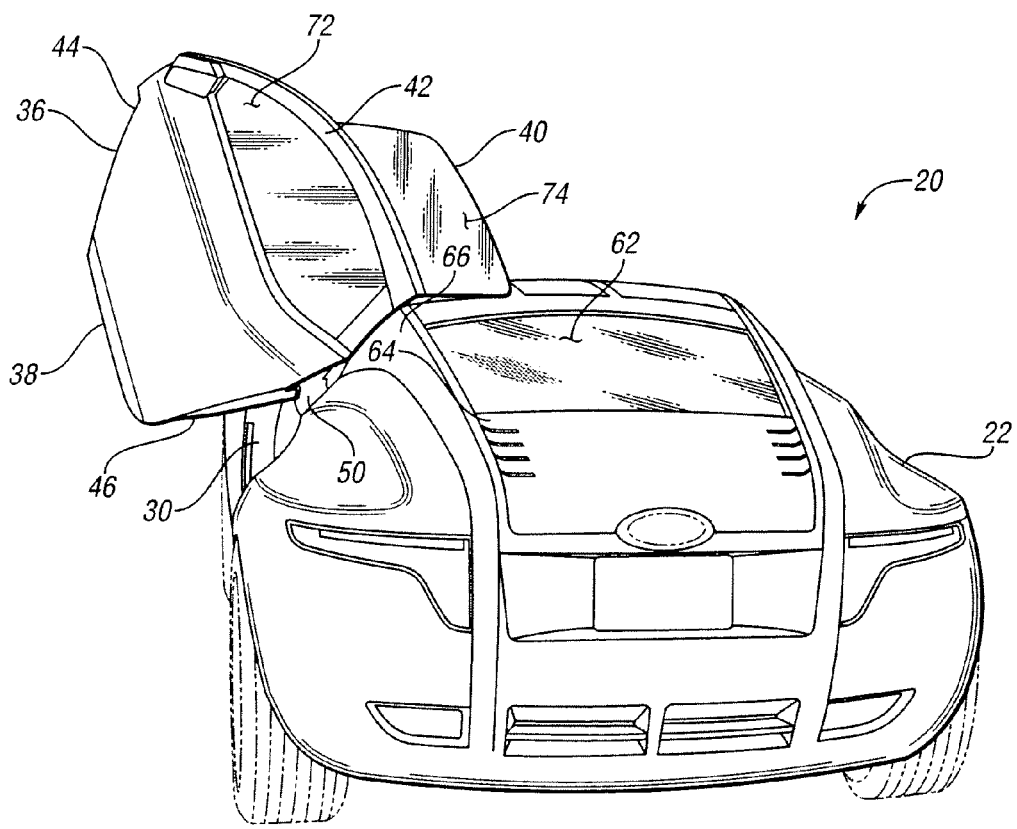
FIG. 8 is a rear end perspective view of the automotive vehicle of FIG. 1, illustrated with the door in the open orientation.

Referring now to FIGS. 7 and 8, a transparent backlight 62 is mounted to the vehicle body 22 at a rearward region 64 of the passenger compartment 24. Another structural pillar 66 is provided on a lateral side of the backlight 62. The door opening 30 may extend rearward to a top region of the backlight 62. Accordingly, the door roof panel 40 may engage a top region above the backlight 62 and a distal end of the pillar 66 in the closed orientation of the door.

Due to the large door opening 30 extending through the roof 34, clearance is provided through the roof 34 of the vehicle body 22 such that passengers are not required to duck while entering and exiting the front row 26 of the passenger compartment. Passengers may enter the front row 26 of the passenger compartment 24, and then sit down.

Figure 5:
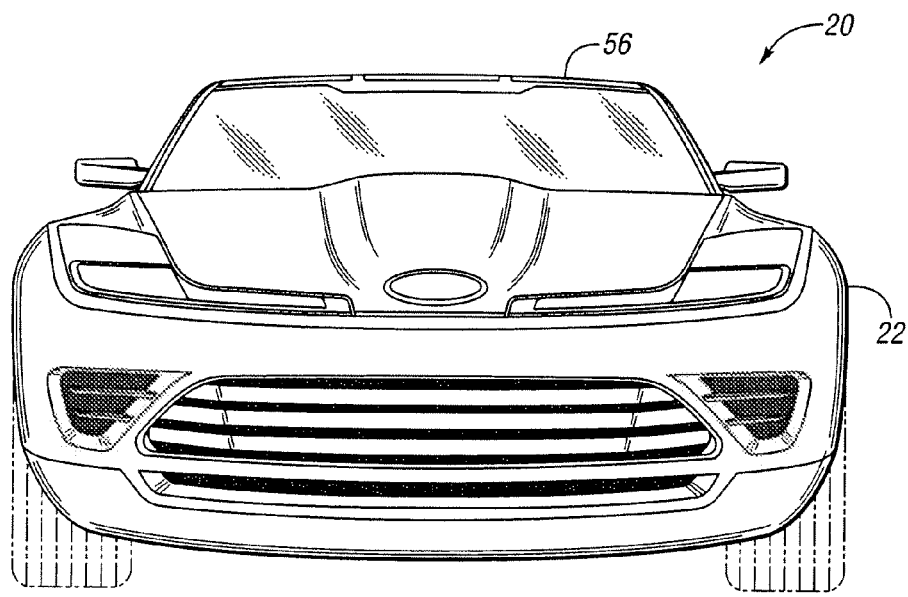
FIG. 5 is a front end elevation view of the automotive vehicle of FIG. 1.
Figure 6:
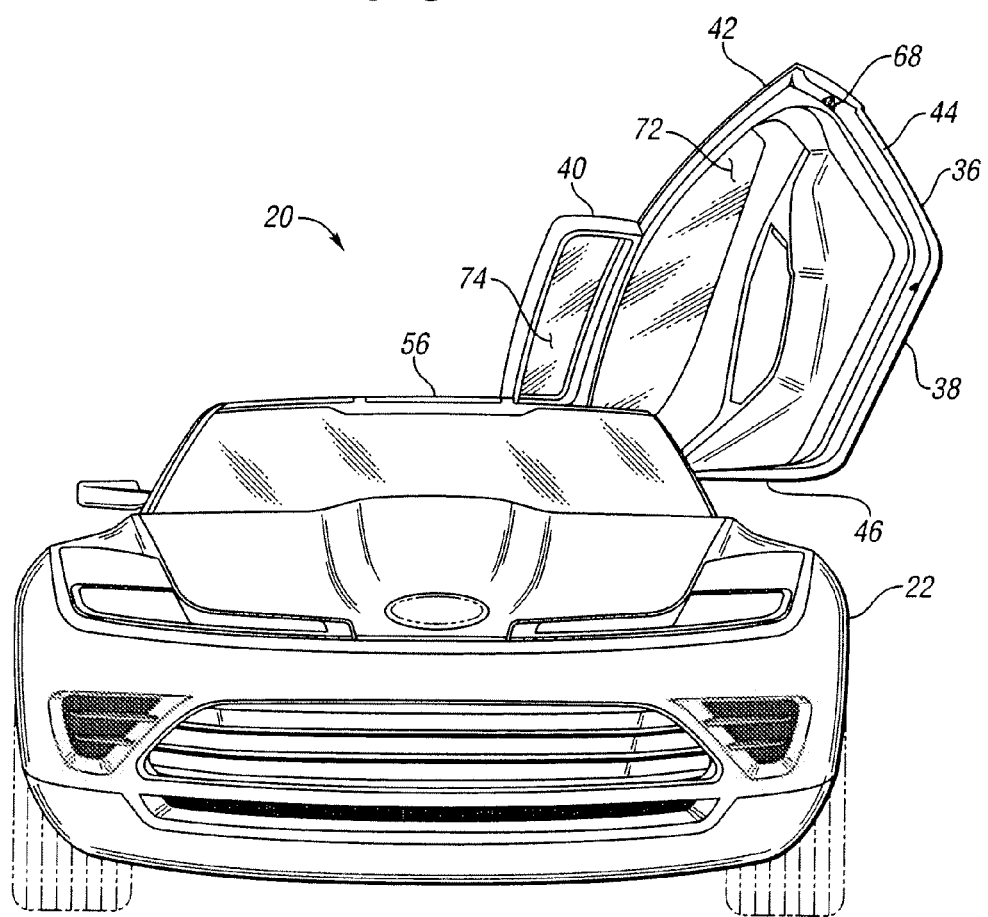
FIG. 6 is a front end elevation view of the automotive vehicle of FIG. 1, illustrated with the door in the open orientation.

Referring now to FIGS. 5 and 7, a streamlined vehicle 20 is provided. In FIGS. 6 and 8, the door 36 is illustrated in the open orientation. The door 36 opens facing forward such that passengers approach the door opening 30 from a forward region of the vehicle 20. By translating the door 36 upward about the pivot axis 54, the door 36 is not greatly extended laterally outboard of the vehicle 20, which is typical with vertically hinged doors.

Referring again to FIG. 2, a forward region of the passenger compartment 24 is generally unobstructed so that the passenger has wide clearance for his or her legs when entering or exiting the front row 26. Such obstructions are generally typical in prior art doors that have a vertical hinge and open rearward facing. Such obstructions are also typical in doors that pivot about a generally horizontal axis provided at a forward region of the passenger compartment 24.

In FIG. 3, a striker 68 is provided on the forward region 44 of the door 36. Likewise, a receiver 70 (FIG. 2) is provided in the door opening 30 for receiving the striker 68 and latching the door 36 in the closed orientation. The striker 68 translates with the door 36 such that it is oriented generally horizontal in the closed orientation of the door.

To maximize occupant external viewing from within the passenger compartment 24, a side window 72 is provided in the side panel 38 of the door 36. Additionally, a roof window 74 is provided in the roof panel 40 of the door 36.

Figure 9:
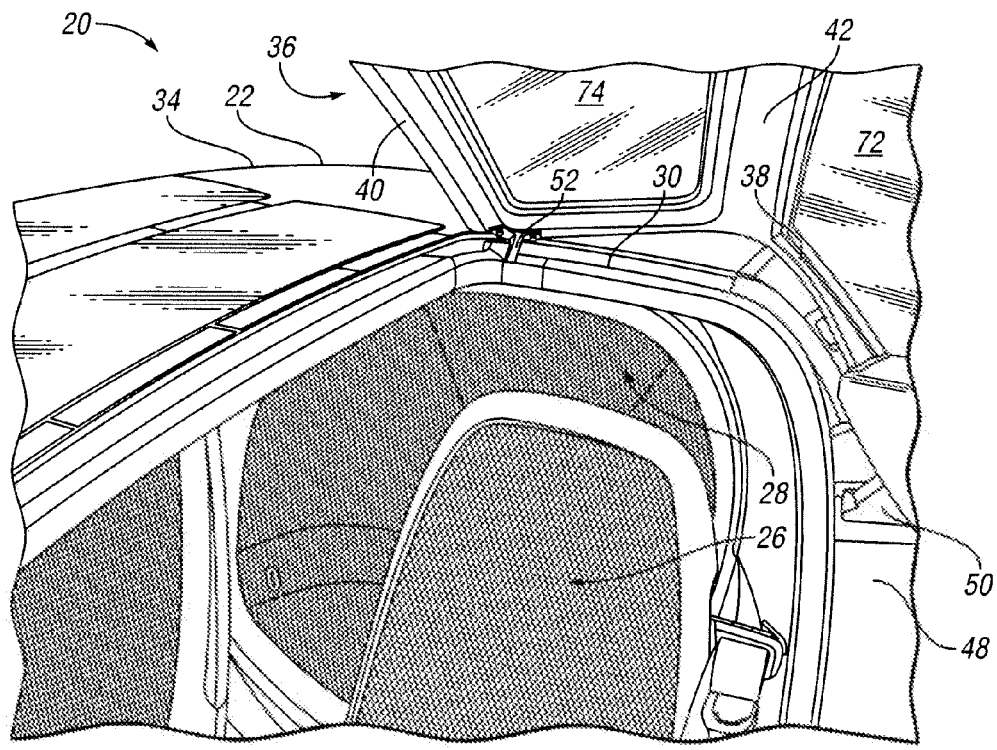
FIG. 9 is an enlarged perspective view of the automotive vehicle of FIG. 1, illustrating a hinge of the door in the open orientation of the door.
Figure 10:
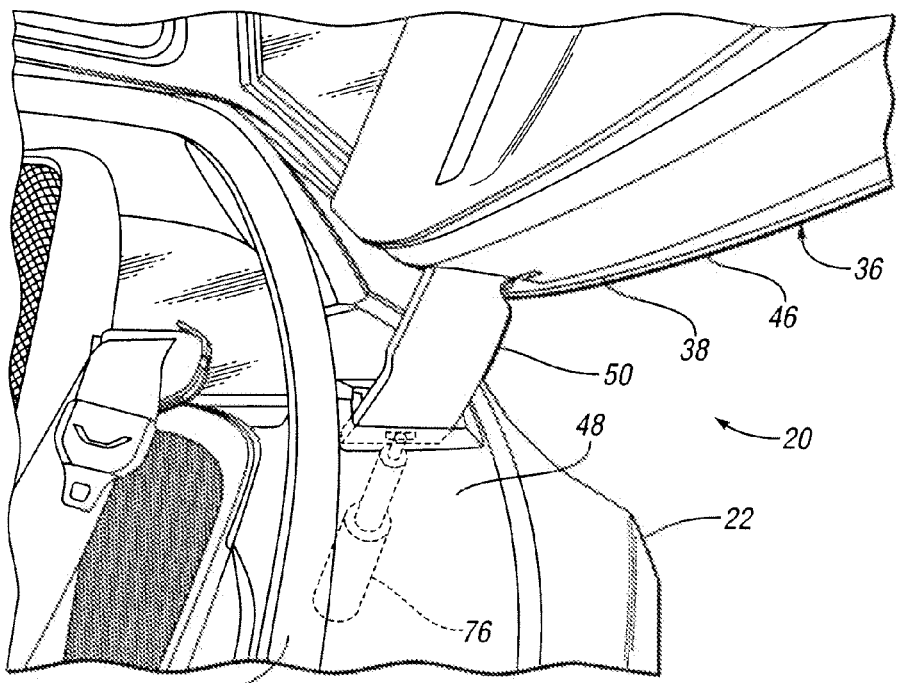
FIG. 10 is another enlarged perspective view of the automotive vehicle of FIG. 1, illustrating another hinge of the door in the open orientation of the door.

With reference now to FIGS. 9 and 10, the hinges 50, 52 are illustrated in greater detail. Both hinges 50, 52 are generally arcuate and are coupled to the vehicle body 22 for sliding translation relative to the vehicle body 22 so that as the arcuate hinges 50, 52 slide, the door 36 is pivoted about the pivot axis 54. Moreover, the arcuate hinges 50, 52 share a common axis of rotation, the pivot axis 54. The rearward door hinge 50 has a radius of curvature (r1) that is greater than the radius of curvature (r2) of the roof panel hinge 52 for increased translation of the door 36 relative to the door opening rearward region 48 with respect to the translation of the door roof panel 40 relative to the roof 34.

As illustrated in FIG. 10, an actuator 76 may be provided within the vehicle body 22 interconnected with the rearward door hinge 50 for driving the door 36 between the open and closed orientations. Due to the vertical displacement of the door 36, the actuator 76 may assist or translate the door 36. The actuator 76 may be a hydraulic actuator, a pneumatic actuator, an electric actuator such as a stepper motor, or the like. Additionally, the actuator 76 may provide support to the door 36 to maintain the door 36 in the open orientation.

In summary, various door, door opening and door hinging features are disclosed, which optimize vehicle compactness, and door positioning for ingress and egress of passengers to and from the passenger compartment 24 of the vehicle 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive vehicle comprising:
   a vehicle body having a passenger compartment for transporting passengers, the vehicle body having a door opening formed therethrough for permitting passenger ingress and egress to and from the passenger compartment;
   a door having an upper region and a rearward region relative to the vehicle body, the door upper region being pivotally connected to the vehicle body and the door rearward region being pivotally connected to the vehicle body for rotary translation between a closed orientation and an open orientation of the door;
   a first arcuate hinge pivotally connecting the door upper region to the vehicle body; and
   a second arcuate hinge pivotally connecting the door rearward region to the vehicle body, wherein the second arcuate hinge has a radius of curvature greater than that of the first arcuate hinge.

2. The automotive vehicle of claim 1 wherein the hinges have an inclined axis extending laterally away from the vehicle body and downward relative to the vehicle body in a rearward direction of the vehicle.

3. The automotive vehicle of claim 1 wherein a forward region of the door is translated upward and laterally outboard from the vehicle body in the open orientation of the door.

4. The automotive vehicle of claim 1 further comprising an actuator for translating the door from the closed orientation to the open orientation.

5. The automotive vehicle of claim 1 further comprising:
   a striker extending from a forward region of the door; and
   a receiver provided in a forward region of the door opening for receiving the striker and latching the door in the closed orientation.

6. The automotive vehicle of claim 5 wherein the striker is oriented generally parallel with a direction of travel of the vehicle in the closed orientation of the door.

7. The automotive vehicle of claim 1 wherein the door is translated vertically upward relative to the vehicle from the closed orientation to the open orientation.

8. The automotive vehicle of claim 7 further comprising a support mechanism for maintaining the door in the open orientation.

9. The automotive vehicle of claim 1 wherein the vehicle body has lateral sidewalls and a roof with the passenger compartment therein, the door opening being formed through one of the sidewalls and the roof for permitting passenger ingress and egress to and from the passenger compartment; and
   wherein the door has a side panel sized to engage the door opening at the sidewall and a roof panel extending from a top region of the side panel, sized to engage the door opening at the roof.

10. The automotive vehicle of claim 9 wherein the door opening in the vehicle body sidewall diverges from a lower region of the vehicle body towards the roof.

11. The automotive vehicle of claim 9 further comprising:
    a transparent windshield mounted to the vehicle body at a forward region of the passenger compartment; and
    a structural pillar displaced along a lateral side of the windshield, wherein the door side panel engages the structural pillar along the length of the pillar in the closed orientation of the door and the door roof panel engages a distal end of the structural pillar in the closed orientation of the door.

12. The automotive vehicle of claim 9 further comprising:
    a transparent backlight mounted to the vehicle body at a rearward region of the passenger compartment; and
    a structural pillar displaced along a lateral side of the backlight, wherein the door roof panel engages a distal end of the structural pillar in the closed orientation of the door.

13. The automotive vehicle of claim 9 wherein the door opening is sized to provide clearance through the roof for permitting passengers to extend at least partially through the roof during ingress and egress to and from the passenger compartment.

14. The automotive vehicle of claim 9 further comprising a transparent panel disposed in the door roof panel for external viewing from the passenger compartment.

15. The automotive vehicle of claim 14 further comprising a transparent panel disposed in door side panel for external viewing from the passenger compartment.

16. The automotive vehicle of claim 1 wherein the first and second arcuate hinges have a common axis of rotation.

* * * * *